(12) United States Patent
Gaiser et al.

(10) Patent No.: US 9,290,150 B2
(45) Date of Patent: Mar. 22, 2016

(54) AIR BAG ASSEMBLY AND TETHER

(71) Applicant: Key Safety Systems, Inc., Sterling Heights, MI (US)

(72) Inventors: John Gaiser, Washington, MI (US); Jeffrey Young, Bruce Township, MI (US); Shakir Salmo, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/347,061

(22) PCT Filed: Oct. 9, 2012

(86) PCT No.: PCT/US2012/059298
§ 371 (c)(1),
(2) Date: Mar. 25, 2014

(87) PCT Pub. No.: WO2013/055656
PCT Pub. Date: Apr. 18, 2013

(65) Prior Publication Data
US 2014/0232091 A1    Aug. 21, 2014

Related U.S. Application Data

(60) Provisional application No. 61/546,528, filed on Oct. 12, 2011.

(51) Int. Cl.
*B60R 21/231*  (2011.01)
*B60R 21/217*  (2011.01)
*B60R 21/2338* (2011.01)

(52) U.S. Cl.
CPC ........... *B60R 21/231* (2013.01); *B60R 21/2171* (2013.01); *B60R 21/2338* (2013.01); *B60R 2021/23386* (2013.01)

(58) Field of Classification Search
CPC ............... B60R 2021/23386; B60R 21/23138
USPC ..................... 280/730.2, 733, 743.2
See application file for complete search history.

(56) References Cited

U.S. PATENT DOCUMENTS

| | | | |
|---|---|---|---|
| 6,454,300 B1* | 9/2002 | Dunkle et al. | 280/742 |
| 6,832,778 B2* | 12/2004 | Pinsenschaum et al. | 280/739 |
| 7,172,212 B2* | 2/2007 | Aoki et al. | 280/730.2 |
| 7,192,053 B2* | 3/2007 | Thomas | 280/739 |
| 8,388,021 B2* | 3/2013 | Mitsuo et al. | 280/743.2 |
| 2002/0129468 A1* | 9/2002 | Wong et al. | 24/265 R |
| 2004/0012180 A1* | 1/2004 | Hawthorn et al. | 280/739 |
| 2005/0057029 A1* | 3/2005 | Thomas | 280/743.2 |
| 2006/0170202 A1* | 8/2006 | Block et al. | 280/743.2 |
| 2006/0237956 A1* | 10/2006 | Fellhauer et al. | 280/740 |
| 2007/0210568 A1 | 9/2007 | Thomas | |
| 2008/0100049 A1 | 5/2008 | Webber | |
| 2008/0238062 A1* | 10/2008 | Parks et al. | 280/743.2 |
| 2008/0290634 A1* | 11/2008 | Sugimori et al. | 280/728.2 |
| 2011/0042921 A1* | 2/2011 | Kjell et al. | 280/728.2 |
| 2012/0292891 A1* | 11/2012 | Kraft et al. | 280/728.2 |
| 2014/0232091 A1* | 8/2014 | Gaiser et al. | 280/728.2 |

FOREIGN PATENT DOCUMENTS

EP    2248558 A1    11/2010

* cited by examiner

*Primary Examiner* — Karen Beck
(74) *Attorney, Agent, or Firm* — Markell Seitzman (57) ABSTRACT

An air bag (102 or 320) having a tether (30 or 130), the tether formed into a hook (155, 157) and loop or eye (142) configured to be looped about a structure including an inflator (332) to which the air bag and tether are to be secured.

6 Claims, 9 Drawing Sheets

AIR BAG ASSEMBLY AND TETHER

RELATED APPLICATIONS

The present invention claims priority to U.S. Provisional Application No. 61/546,528 filed on Oct. 12, 2011 entitled "Air Bag Assembly And Tether".

BACKGROUND AND SUMMARY OF THE INVENTION

The present invention generally relates to an apparatus and process of securing an air bag to an adjacent portion of a vehicle or of a seat structure.

More specifically, the invention comprises an air bag assembly comprising an air bag and tether, the tether includes an integrally formed hook and eye connector to secure the air bag to an adjacent structure of the vehicle or vehicle seat.

DETAILED DESCRIPTION OF THE DRAWINGS

Figure 1:
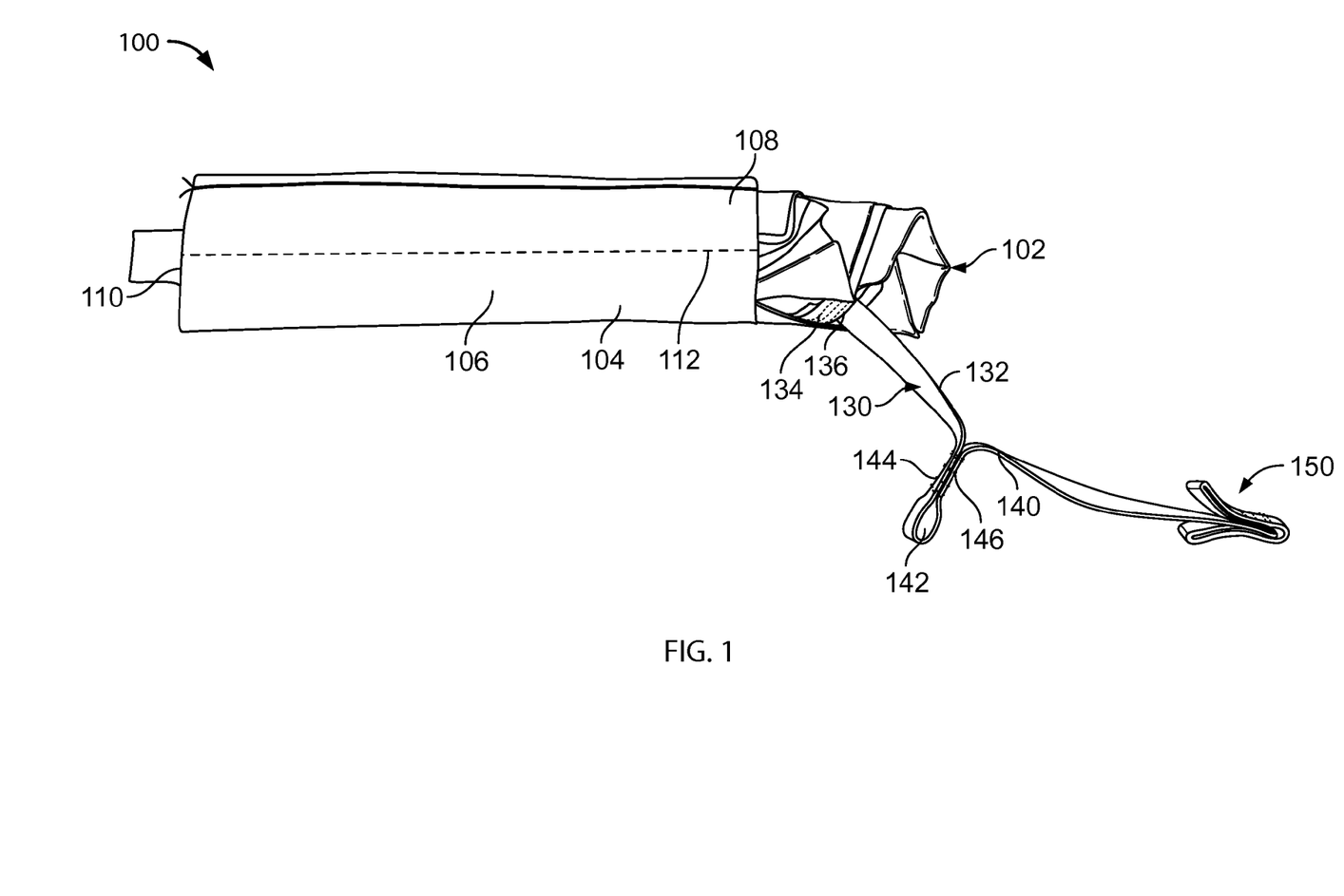
FIG. 1 shows of the major features of the present invention.
Figure 2:
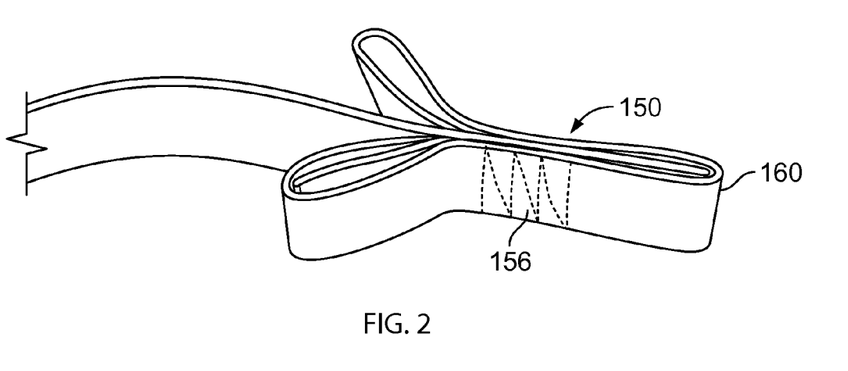
FIGS. 2 and 3 show details of a barbed end of a tether.
Figure 3:
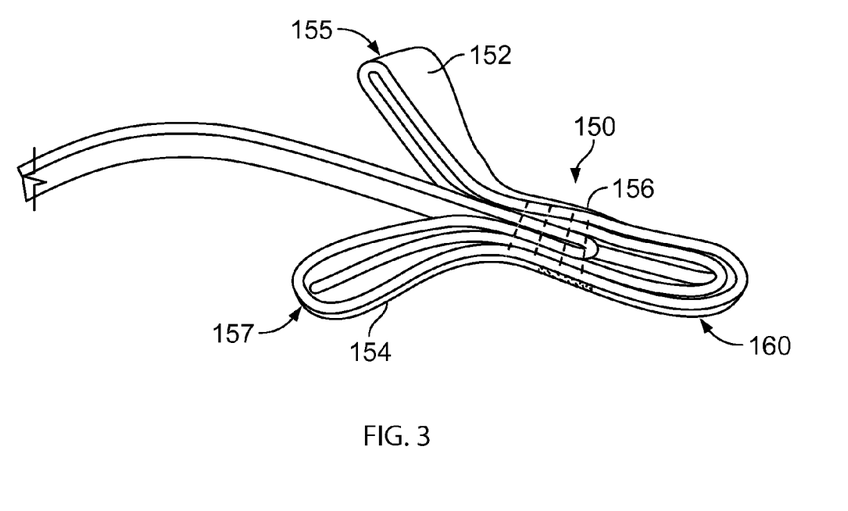

Reference is made to FIGS. 1-3 which show many of the major components of the present invention. FIG. 1 illustrates an air bag assembly 100 comprising an air bag 102. Upon folding the air bag into a narrow profile, the air bag is fitted within a flexible sleeve or cover 104 in a known manner. The air bag may be folded utilizing any of many techniques to create a plurality of accordion pleats or to create pleats that form a plurality of folds shaped as the letter U. The flexible sleeve has a body 106 and ends 108 and 110. The sleeve may also include a plurality of stress risers such as a perforated seam 112 which aids in the tearing apart of the sleeve as the air bag 102 inflates.

The air bag 102 of the present invention, as will be seen below, will be positioned on a seat frame 200 and is configured to provide protection to the occupant's lower torso, or lower and mid-torso or lower, mid-torso and head.

Figure 4A:
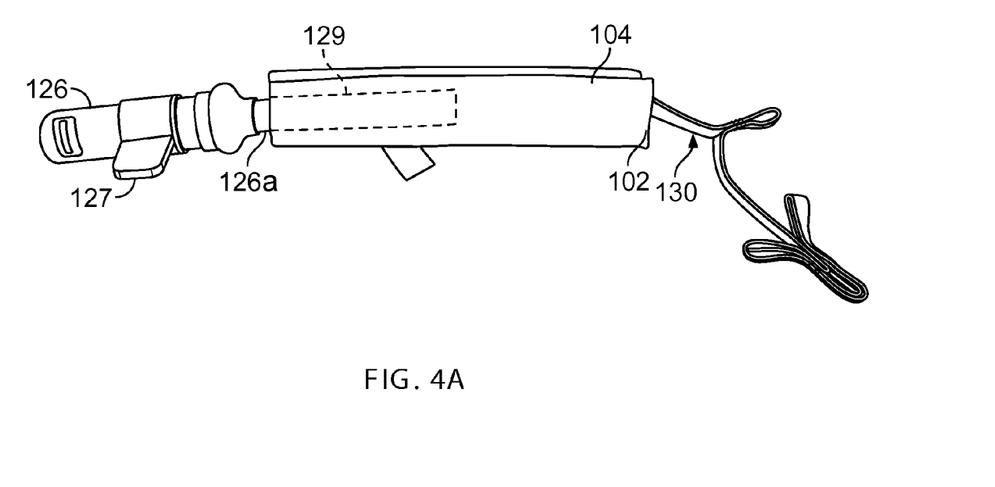
FIG. 4A shows an inflator connected to the folded air bag with a sleeve or cover about the air bag.
Figure 4B:
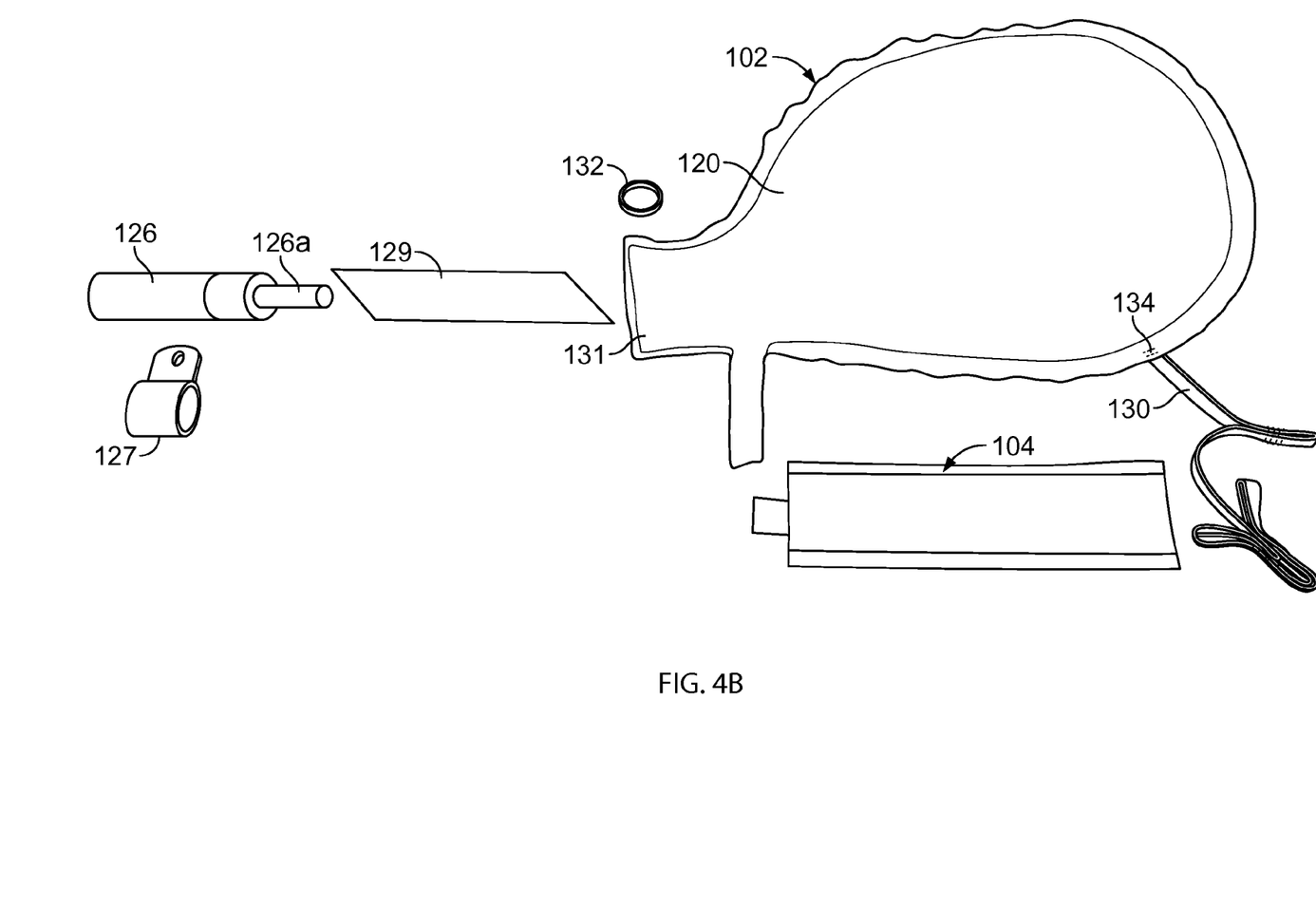
FIG. 4 diagrammatically illustrates an exploded view of an air bag module utilizing the present invention.
Figure 7:
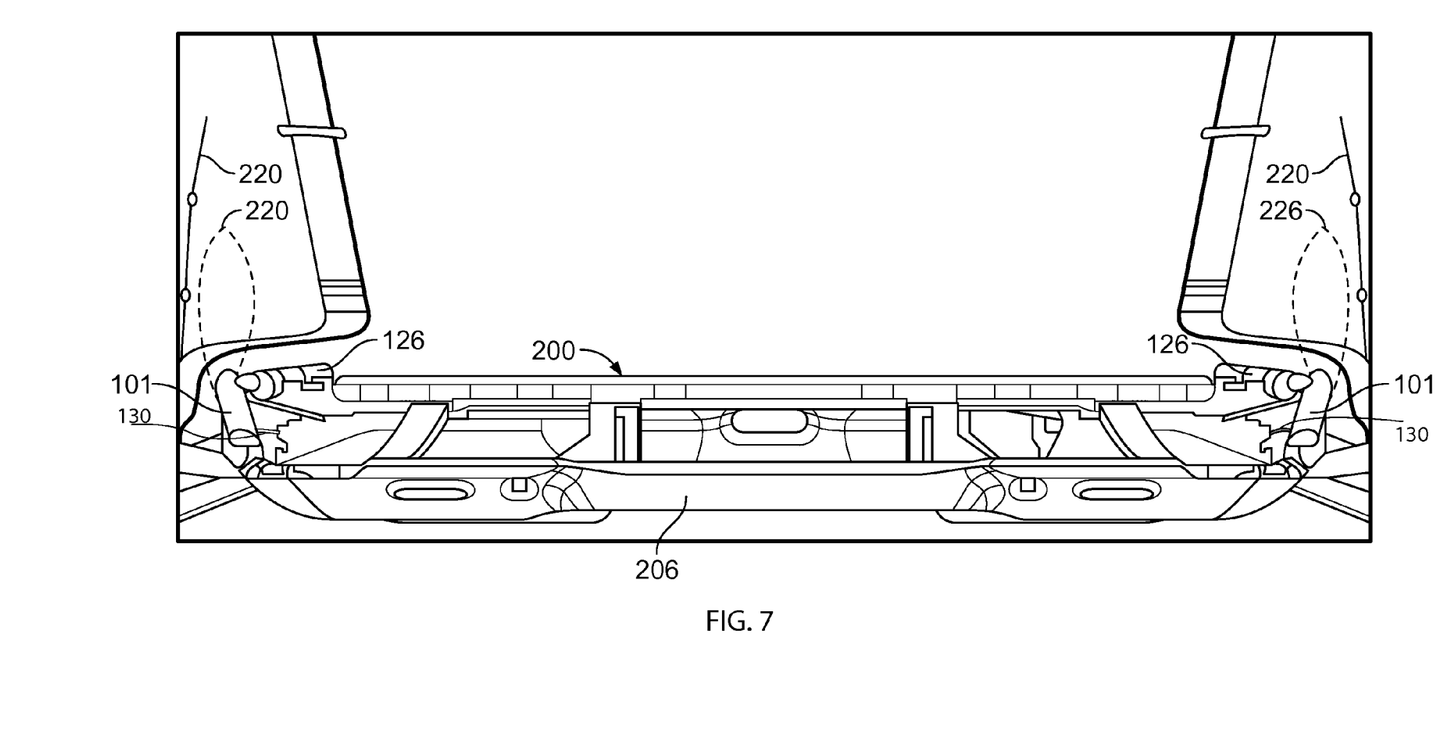
FIGS. 7 and 8 show the seat frame and the location of air bag modules.

Reference is briefly made to FIG. 4 which illustrates an exemplary side air bag (side impact air bag) which, when inflated, is designed to be positioned between the side of an occupant and interior-side of the vehicle passenger compartment, as shown in FIG. 7, to provide protection to the occupant upon a side impact crash. The air bag 102 may include one or more inflatable chambers such as 120. An air bag inflator 126 is positioned within air bag 102 and may include a frame or bracket 127 enabling the inflator and air bag to be secured to an adjacent portion of the seat or vehicle frame. The inflator 126 is positioned, see FIG. 4A, within one end of a diffuser hose 129. The exit end 126a of the inflator and the diffuser hose are inserted into the neck 131 of air bag 102. A ring clip 133 holds the neck 131 and diffuser hose 129 about the inflator 126.

Air bag 102, as illustrated in FIGS. 1 and 4, is connected to a tether 130. The tether includes a length of flexible material including a length of thin woven material or rope 132. In the illustrated embodiment, the tether material 132 is formed as a thin, flat woven piece of material. One end 134 of the tether 130 is secured such as by stitches 136 to a border region of the air bag 102. A medial portion 140 of tether 130 is formed into a loop 142. As illustrated in FIG. 1, a portion 144 of the tether is sewn upon itself using a plurality of stitches 146 to form loop 142. The remote end 150 of the tether 130 is first formed into a plurality of loops 152 and 154; each loop 152 and 154 is positioned on an opposite side of the tether 130. As can be seen in FIGS. 2 and 3, each of these loops form a hook or barbed structure 155 or 157 respectively and when combined form a double hook or barbed end structure 155 and 157. The various loops are secured together by a plurality of stitches 156. This construction also forms the remote end of the tether into a pointed, tipped or arrow like structure 160.

In the prior art, the remote end of the tether is often connected to a metal hook which is inserted within an opening in sheet metal. In one known embodiment, a flexible hook-like structure replaces the metal and is itself pushed within an opening in sheet metal thereby securing the tether and air bag to the sheet metal.

Figure 5:
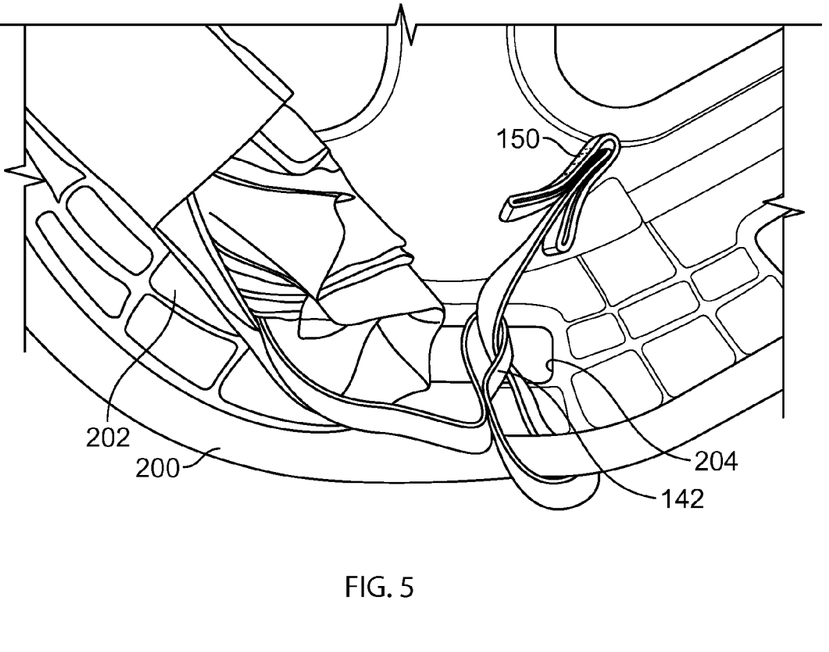
FIGS. 5 and 6 illustrate the air bag secured to a portion of the seat frame utilizing the tether of the invention.
Figure 6:
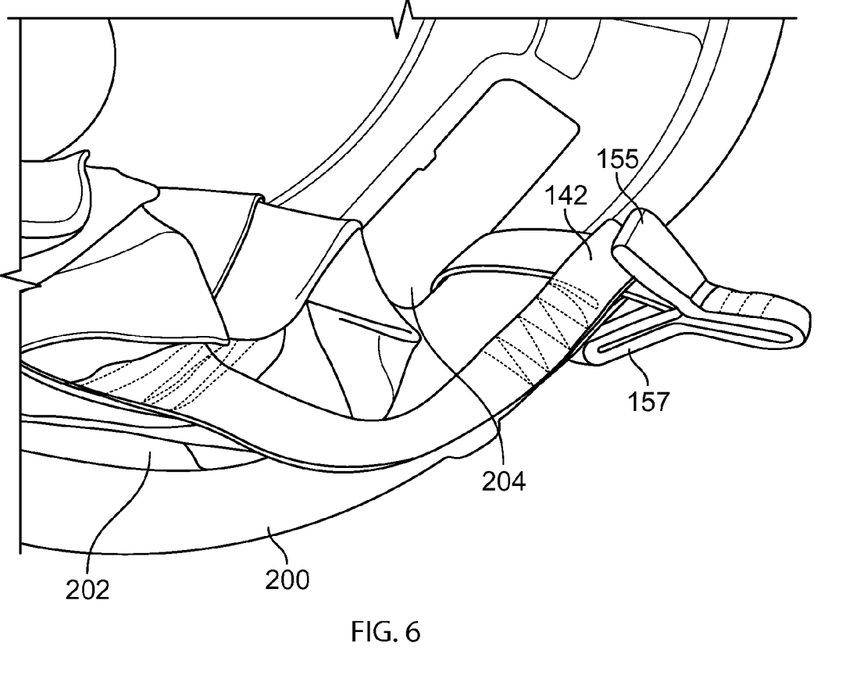

FIGS. 5 and 6 illustrate a portion of the frame 200 of a vehicle seat. The frame includes some generally planar portions such as 202 and at least one opening or hole 204. To secure the air bag and tether to the seat, the loop 142 is positioned atop a portion of the frame immediately adjacent opening 204. The remote end 150 of the tether 130 is looped about the frame, and the pointed end 160 is threaded through and pulled through the loop 142. In FIG. 5, the remote end 150 of the tether 130 has been pulled a distance away from the loop 142 to illustrate the relative positioning of the components. Subsequently, that portion of the tether forming the loop (about the seat) is pulled thereby moving the barbed structure or double hooks 155 and 156 closer to the loop 142. As is shown more clearly in FIG. 6, the flexible barbed structure is sufficiently wide so it engages the exterior of the loop and then flares outwardly preventing the remote end 150 from being pulled through the loop 142. In this manner, the air bag is secured to the seat utilizing a hook and loop or hook and eye connector integrally formed by portions of the tether 130.

Figure 8:
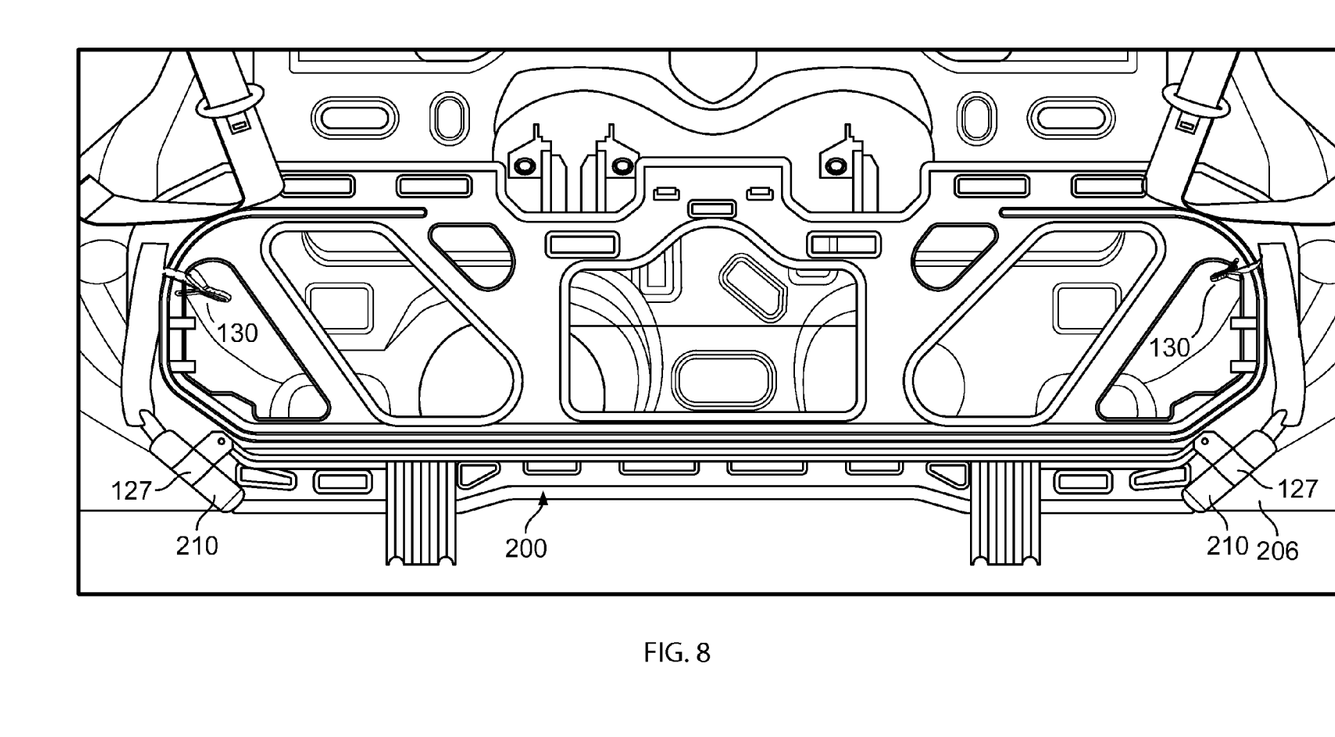

Reference is briefly made to FIGS. 7 and 8 that respectively show a rear view and front view of the rear seat. The seat frame 200 is shown more completely than in FIGS. 5 and 6. A seat pan or enclosure 206 is positioned below the frame. Two air bag modules 210 are secured at opposite sides of the frame. As can be seen, inflator 126 is secured by bracket 127 to the frame with the air bag 102 secured to the frame by tether 130. FIG. 7 illustrates a first set of phantom lines 220 that diagrammatically illustrates the interior sides of the vehicle. A second set of phantom lines 220 shows the inflated air bags adjacent the vehicle sides.

Figure 9:
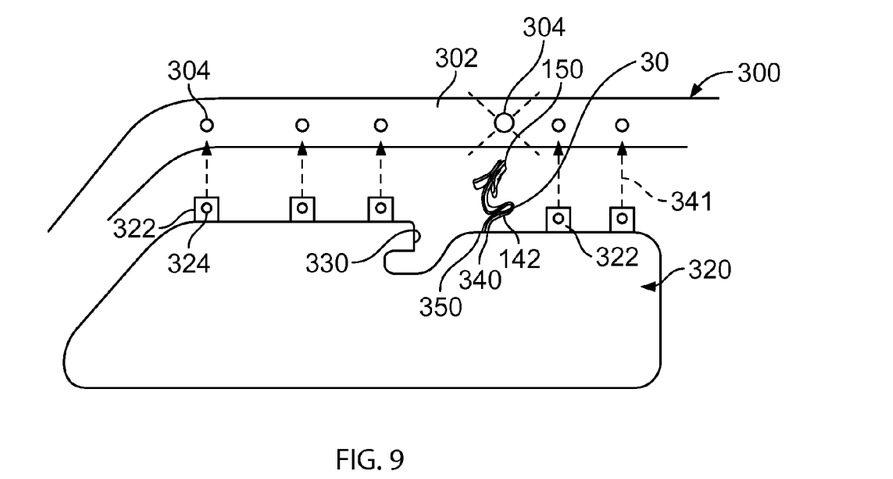
FIGS. 9 through 12 illustrate an alternate embodiment of the invention.
Figure 10:
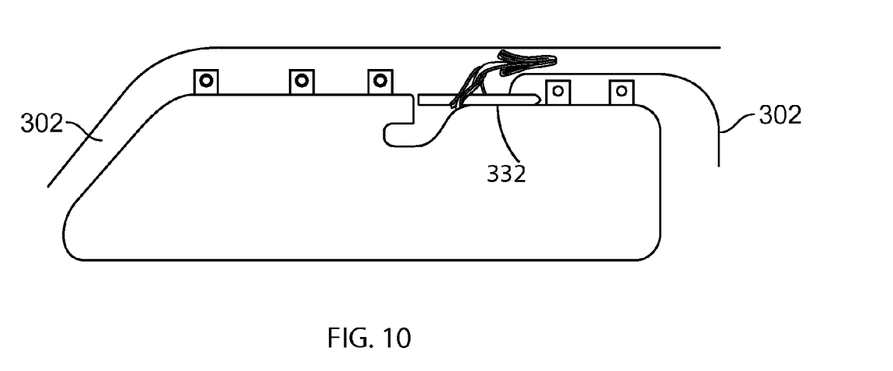

FIGS. 9-12 illustrate an alternate embodiment of the present invention. FIG. 9 illustrates the interior of a vehicle 300 and its roof rail 302. The roof rail includes a plurality of openings 304 that identify mounting locations for a curtain air bag 320. The curtain air bag includes a plurality of tabs 322, each tab having an opening 324. Air bag 320 includes an inlet 330 into which is placed an air bag inflator 332, shown in FIG. 10. At location 340 of FIG. 9, air bag 320 includes a tether such as 30 instead of another tab 322. Tether 30 includes loop 142 and the remote, hook end 150 instead of another tab 322. When air bag 320 is mounted to the roof rail 302, the air bag 320, which at this time is folded into a compact thin rectangular configuration, with the air bag is placed within a cover similar to cover 104 with tabs and tether 30 extending therefrom and moved, see arrows 342, to the mounting holes whereupon fasteners such as threaded bolts are inserted into holes 324 and then into holes 304.

Figure 11:
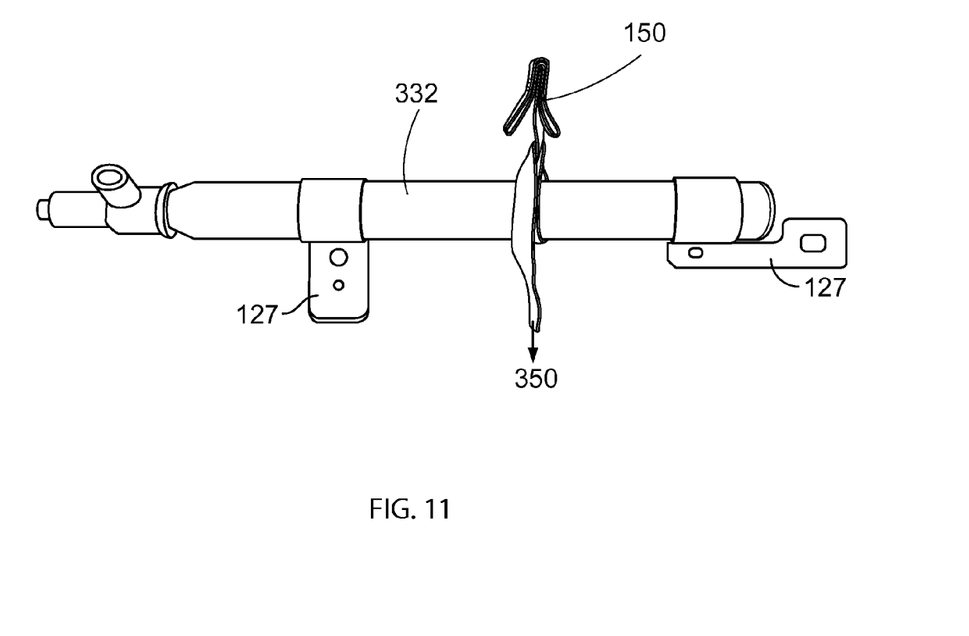
Figure 12:
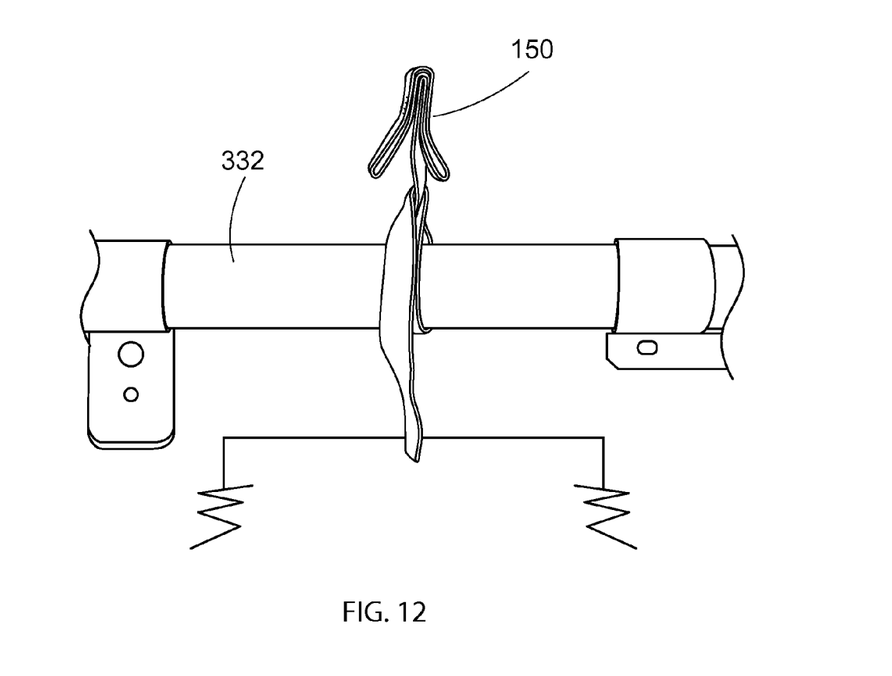

It sometimes happens that a relatively long inflator 332 is secured to the neck 330 of air bag is 320. As can be appreciated utilizing such a lengthy inflator might obscure mounting hole 304a thereby making it impossible to insert the fastener through the tab opening. In this embodiment of the invention, the tab that might have been located at position 340 is replaced by tether 30. FIG. 11 represents inflator 332 with its mounting brackets 127. Tether 30 is secured to a border region 350 of the curtain 320. As previously mentioned, tether 30 includes loop 142 and end 150 with the hook 155 or 157 or hooks 155 and 157. In this embodiment, end 150 is wrapped about the inflator and then threaded through the loop 142 thereby securing the air bag in the vicinity of the location 340 to the inflator 332 rather than to the roof rail.

Many changes and modifications in the above-described embodiment of the invention can, of course, be carried out without departing from the scope thereof. Accordingly, that scope is intended to be limited only by the scope of the appended claims.

The invention claimed is:

1. An air bag (102 or 320) having a tether (30 or 130), the tether (30 or 130) formed into a hook (155 or 157) or hooks (155 and 157) and an eye (142) configured to be looped about a structure to which the air bag and tether are to be secured, wherein the hooks (152 and 154) are secured by a plurality of stitches (156) wherein a remote end (150) having the hooks (155 and 157) is formed into a pointed tip or arrow like structure (160) and wherein to secure the air bag to a frame of a seat, the remote end (150) of the tether (130) is looped about the frame, and the pointed tip or arrow like structure (160) is threaded through the eye (142), subsequently that portion of the tether forming the hook (152 and 154) form a double hook or barbed structure (155 and 157) about the seat is pulled moving the barbed structure or double hooks (155 and 157) toward the eye (142) to secure the air bag to the seat.

2. The air bag (102 or 320) having a tether (30 or 130) of claim 1 wherein a portion of the tether (130) is sewn upon itself using a plurality of stitches (146) to form the loop or eye (142).

3. The air bag (102 or 320) having a tether (30 or 130) of claim 1 wherein the remote end (150) is first formed into a plurality of loops (152 and 154), each loop is positioned on an opposite side of the tether (30 or 130).

4. The air bag (102 or 320) having a tether (30 or 130) of claim 1 wherein an end (134) of the tether (130) is secured by stitches (136) to a border region of the air bag (102).

5. The air bag (102 or 320) having a tether (30 or 130) of claim 1 wherein the air bag is a seat airbag (102).

6. An air bag (102 or 320) having a tether (30 or 130), the tether (30 or 130) formed into a hook (155 or 157) or hooks (155 and 157) and a loop or eye (142) configured to be looped about a structure including an inflator (332) to which the air bag and tether are to be secured, wherein the air bag is a curtain air bag (320) and the curtain air bag (320) has a plurality of tabs (322), each tab (322) having an opening (324) for attachment to mounting locations along a roof rail (302), the curtain airbag (320) includes an inlet (330) into which an inflator (332) is placed and the air bag (320) has a location (340) having the tether (30), the tether (30) includes the loop (142) and the tether (30) is secured to a border region (350) of the curtain air bag (320), the tether (30) has the end (150) wrapped about the inflator (332) and then threaded through the loop (142) securing the airbag in the vicinity of the location (340) to the inflator.

* * * * *